United States Patent [19]

Cedrone et al.

[11] Patent Number: 4,766,548

[45] Date of Patent: Aug. 23, 1988

[54] TELELINK MONITORING AND REPORTING SYSTEM

[75] Inventors: Louis A. Cedrone, Eastchester, N.Y.; Joseph J. Sobodowski, Miami, Fla.

[73] Assignee: PepsiCo Inc., Purchase, N.Y.

[21] Appl. No.: 36

[22] Filed: Jan. 2, 1987

[51] Int. Cl.[4] .............................................. G06F 15/20

[52] U.S. Cl. .................................... 364/479; 379/102; 379/106; 221/9

[58] Field of Search ................ 364/479; 379/102, 106; 221/9

[56] References Cited

U.S. PATENT DOCUMENTS

| | | | |
|---|---|---|---|
| 3,724,715 | 4/1973 | Auriemma | 221/4 |
| 4,216,461 | 8/1980 | Werth et al. | 364/479 |
| 4,225,056 | 9/1980 | Flubacker | 194/2 |
| 4,231,105 | 10/1980 | Schuller et al. | 364/479 |
| 4,241,237 | 12/1980 | Paraskevakos et al. | 340/150 |
| 4,280,181 | 7/1981 | Levasseur | 364/479 |
| 4,328,539 | 5/1982 | Heeger | 364/479 |
| 4,350,238 | 9/1982 | Shah et al. | 221/7 |
| 4,354,613 | 10/1982 | Desai et al. | 364/479 |
| 4,359,147 | 11/1982 | Levassuer | 221/21 |
| 4,369,442 | 1/1983 | Werth et al. | 364/479 |
| 4,381,835 | 5/1983 | Shah et al. | 364/479 |
| 4,398,651 | 8/1983 | Kumpfer | 340/825.35 |
| 4,412,292 | 10/1983 | Sedam et al. | 364/479 |
| 4,512,453 | 4/1985 | Schuller et al. | 364/479 |
| 4,553,211 | 11/1985 | Kawasaki et al. | 364/479 |
| 4,593,361 | 6/1986 | Otten | 364/464 |
| 4,616,323 | 10/1986 | Hayashi | 364/900 |
| 4,654,800 | 3/1987 | Hayashi et al. | 364/479 |
| 4,674,055 | 6/1987 | Ogaki et al. | 364/479 |

*Primary Examiner*—Jerry Smith
*Assistant Examiner*—Allen MacDonald
*Attorney, Agent, or Firm*—Scully, Scott, Murphy & Presser

[57] ABSTRACT

A microprocessor controlled system for monitoring, storing and periodically reporting on data pertinent to the commercial operation of a reporting system, such as a soft drink vending machine, to a central data collection and monitoring computer, and which periodically reports such data over a telephone line which it accesses on a nondedicated basis. The microprocessor controls operations of the telelink system, and stores in memory data related to the overall status of the commercial operation of the reporting system, such as totals, inventory, etc. Reporting system status sensors are provided for reporting on the status of the reporting system without interrupting normal operation thereof, such that a problem with the operation of or a malfunction of the telelink system does not adversely affect operation of the reporting system. Communication with the data collection processor system is provided by a telephone interface circuit which enables the microprocessor to periodically and on a nondedicated basis use an existing telephone line, which is otherwise used in normal service for telephones coupled thereto. A modem is also provided for enabling data messages to be transferred through the telephone interface circuit to the data collection system.

27 Claims, 8 Drawing Sheets

TELELINK MONITORING AND REPORTING SYSTEM

BACKGROUND OF THE INVENTION

1. Field of the Invention

The present invention relates generally to a microprocessor controlled telelink system for monitoring, storing and periodically reporting on data pertinent to the commercial operation of a reporting system, such as a soft drink vending machine, to a central data collection and monitoring system. More particularly, the subject invention pertains to a microprocessor controlled system as described which periodically reports such data over a telephone line which it accesses on a nondedicated basis.

2. Discussion of the Prior Art

The prior art in general discloses a variety of systems for monitoring various occurrences within vending machines such as inventory changes, service calls, cash receipts, demand for certain products, sold-out conditions, and miscellaneous alarm functions. However, the broad generic functions provided by the vending machine monitoring systems of the prior art have been limited in the details of their functional capabilities and, therefore, the amount of relevant data that could be generated to facilitate the smooth and efficient service and operation of a network of vending machines. However, these prior art monitoring systems have also had a number of disadvantages associated therewith. One major disadvantage has been that the monitoring system is frequently an integral part of the vending machine such that a failure or malfunction of a component therein adversely affects operation of the vending machine.

Sedam et al U.S. Pat. No. 4,412,292 also discloses a system for remotely monitoring a vending machine and for automatically communicating conditions at the vending machine to a central computer complex. Each vending machine is provided with a microprocessor which monitors and stores data within that machine and transmits the data, as by a telephone line, to a central computer, either immediately or at scheduled call-in times. The distributed logic between the vending machine microprocessors and the central computer complex is designed to provide various alarm function signals, and also provides for inventory control and efficient route planning for the supply and maintenance of the machines. One disadvantage of the Sedam et al system is that the type of telephone connection disclosed therein requires a dedicated telephone line, which represents an additional operating cost and also presents installation problems. Another disadvantage of the Sedam et al system is that it is designed with a high voltage interface with the vending machine control circuits, which results in an increase in the overall cost of the system.

SUMMARY OF THE INVENTION

Accordingly, it is a primary object of the present invention to provide a microprocessor controlled system for monitoring, storing and periodically reporting on data pertinent to the commercial operation of a reporting system, such as a soft drink vending machine, to a central data collection and monitoring computer, and which periodically reports such data over a telephone line which it accesses on a nondedicated basis. The telelink system of the present invention has direct application to several different types of commercial reporting systems. For instance, the reporting system might comprise a commercial drink dispensing system which includes a digital control system, preferably microprocessor controlled, which monitors the overall operation of the drink dispensing system and stores in memory information pertinent to the operation thereof. The telelink system of the present invention could also be utilized in association with a bulk syrup delivery system of the type disclosed generally in U.S. Pat. No. 4,553,573 for Bulk Syrup Delivery System.

A further object of the subject invention is the provision of a microprocessor controlled monitoring system which interfaces to a reporting system, such as a vending machine, without disturbing the normal operation thereof, such that a malfunction or operating problem with the monitoring system does not adversely disturb the normal operation of the reporting system.

In accordance with the teachings herein, the present invention provides a telelink system designed to report data pertinent to the commercial operation of a reporting system to a central data collection system. A microprocessor is provided for controlling operation of the telelink system, and stores in memory data related to the overall status of the commercial operation of the reporting system, such as totals, inventory, etc. The term microprocessor is used herein to designate a microprocessor per se or a microprocessor as a component of a microcomputer. In the illustrated embodiment, a microcomputer is preferred because of its more comprehensive capabilities which are taken advantage of in the design of the circuit. The telelink system utilizes reporting system status sensors for reporting on the status of the reporting system without interrupting normal operation thereof, such that a problem with the operation of or a malfunction of the telelink system does not adversely affect operation of the reporting system. Communication with the data collection processor system is provided by a telephone interface circuit which enables the microprocessor to periodically and on a nondedicated basis use an existing telephone line, which is otherwise used in normal service for telephones coupled thereto. A modem is also provided for enabling data messages to be transferred through the telephone interface circuit to the data collection system, and in some embodiments the modem function might be provided by a microcomputer.

In greater detail, the telelink system is provided with a low voltage power supply, such that UL approval thereof is not required. Power failures or fluctuations are also taken into account by a power sensor circuit which holds the microprocessor in a "reset" state until the power supplied by the power supply is stable. The microprocessor also stores data in RAM memories, and the power sensor circuit holds the RAM "write" input inactive until a given time delay after the microprocessor is released from the "reset" state. An external RAM memory is also provided with a backup battery power supply to store data therein in the event of a power failure.

The telephone interface circuit includes an FCC certified relay hook switch to make telephone connections, and the microprocessor controls the generation of touch tone dialing signals. The microprocessor also controls operation of the hook switch to produce pulse dialing signals in telephone areas not serviced by touch tone dialing.

The telelink system is also provided with a telephone line status monitor circuit for indicating to the microprocessor whether or not the telephone line is in-use, and the microprocessor does not disturb the telephone line during normal usage thereof. A modem filter circuit provides transmit filters for conditioning outbound signals to telephone system specifications and receive filters for conditioning inbound signals to improve reception and data recovery therefrom. Transmission gates in parallel with the modem filter circuit are controlled by the microprocessor to bypass the modem filter circuit during touch tone dialing.

The telelink system may also incorporate therein optical coupling to provide electrical isolation from electrical signals and noise associated with the reporting system, such as might be presented by the coin changer mechanism of a vending machine. In one disclosed embodiment, a radio interface circuit can be utilized to provide a simplex radio link in an outbound direction only to a nearby, local radio receiver coupled to the telephone line servicing the telelink system.

In a preferred commercial embodiment, the microprocessor is preferably a part of a commercially available microcomputer which incorporates a modem therein, is capable of generating touch tone signals, and encoding and decoding 300 Baud frequency-shift-key modulation signals. The microcomputer has internal RAM and ROM memories, and access to external RAM and ROM memories, and an external EEPROM memory is also incorporated therein which is capable of storing data without power. The EEPROM memory is used to store relatively permanent data, such as the reporting system identification number, the telephone number to be called to reach the data collection system, and data on the parameters of the particular reporting system to which the telelink system is coupled. The microcomputer is programmed to periodically, at regular intervals, attempt to place a telephone call to the data collection processor system to download data thereto, and also to receive data therefrom. In general operation, the microcomputer is programmed to give data collection by the operating system status sensors a top priority over other tasks performed thereby such as the data reporting function.

BRIEF DESCRIPTION OF THE DRAWINGS

The foregoing objects and advantages of the present invention for a telelink monitoring and reporting system may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
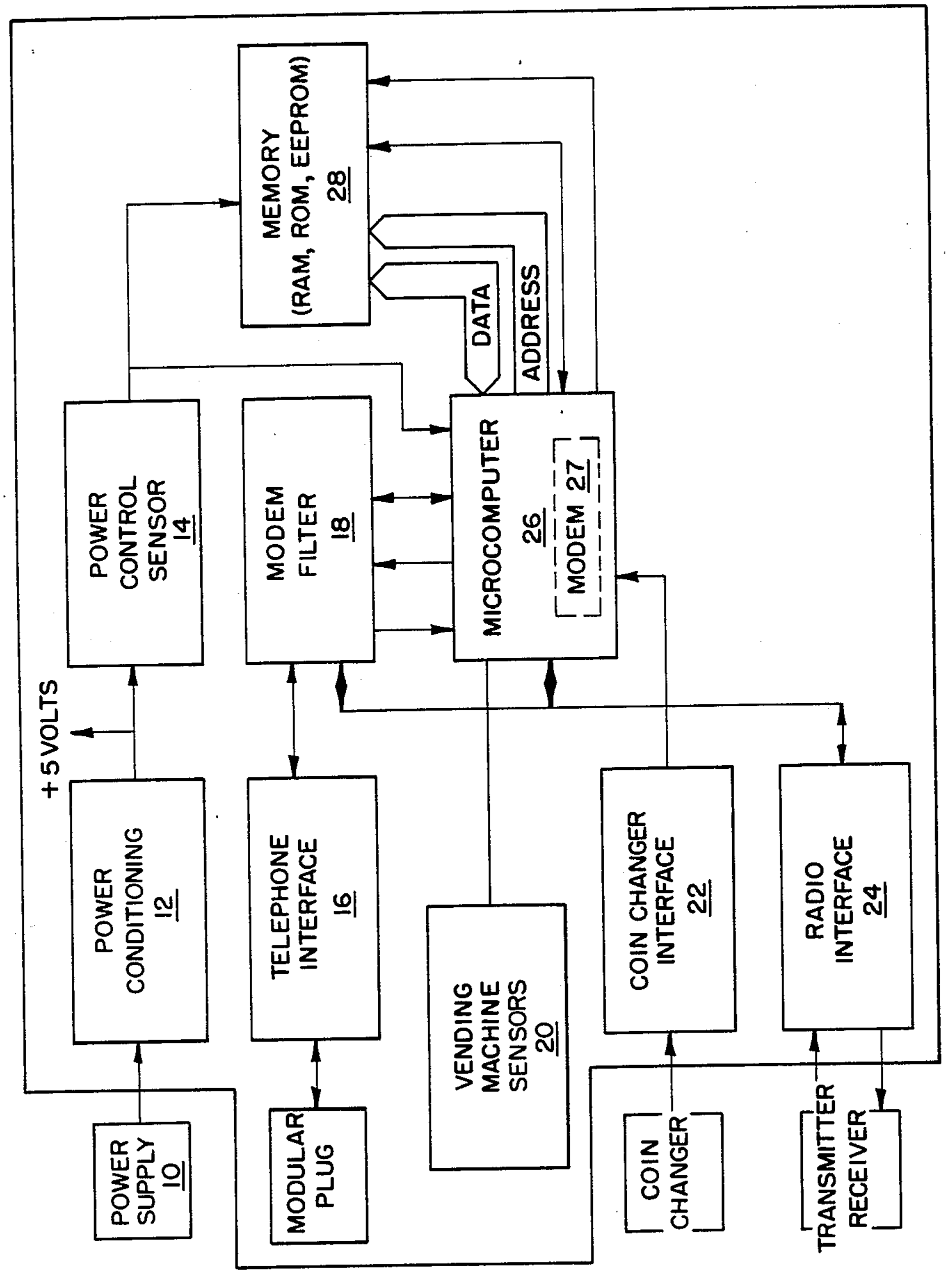
FIG. 1 is a functional block diagram of the major components of the telelink system.

Referring to the drawings in detail, FIG. 1 is a block diagram of the overall telelink system which can be divided into the following functional blocks, a power supply 10, a power conditioning circuit 12, a power sense or sensor circuit 14, a telephone interface circuit 16, a modem filter 18, vending machine sensors 20, a coin changer interface 22, a radio interface 24, a microcomputer 26, and several types of memory 28.

The Telelink power supply 10 is designed to provide two stages of regulated voltage, +12 volts for the radio transmitter or receiver, and +5 volts for the microcomputer board. An input low voltage AC power at 15 volts (RMS) is supplied to the power supply 10 by an off-board, UL listed, packaged table-top transformer, not illustrated, which is a particulary advantageous design as the low voltage design for the telelink system itself does not thereby require UL approval and listing.

The output of the power supply, when an AC input voltage is applied to its input, is regulated at +12 volts and is used to power the Hall-effect switch sensors, the telephone hook-switch (relay) and, if applicable, the radio transmitter or receiver. The +12 volts, in turn, supplies the +5 volt regulator which powers the rest of the unit.

In the power conditioning circuits 12, a low voltage AC is conditioned for transients, then rectified, filtered, and regulated at +12 volts which is distributed to the radio transmitter or receiver, if the unit is radio equipped, and to the +5 volt regulator for distribution to all the active circuits on the board. The +5 volt regulator is powered by the output of the +12 volt regulator to minimize +5 volt regulator heating, especially with high AC voltage line conditions. Additional transient suppression is preferably provided at several points in the power supply and power sensor circuits. As a practical matter, some types of vend motors create severe transients when turned on and off, necessitating a great deal of noise suppression to prevent adverse effects on the electronic circuits of the telelink system.

Figure 6:
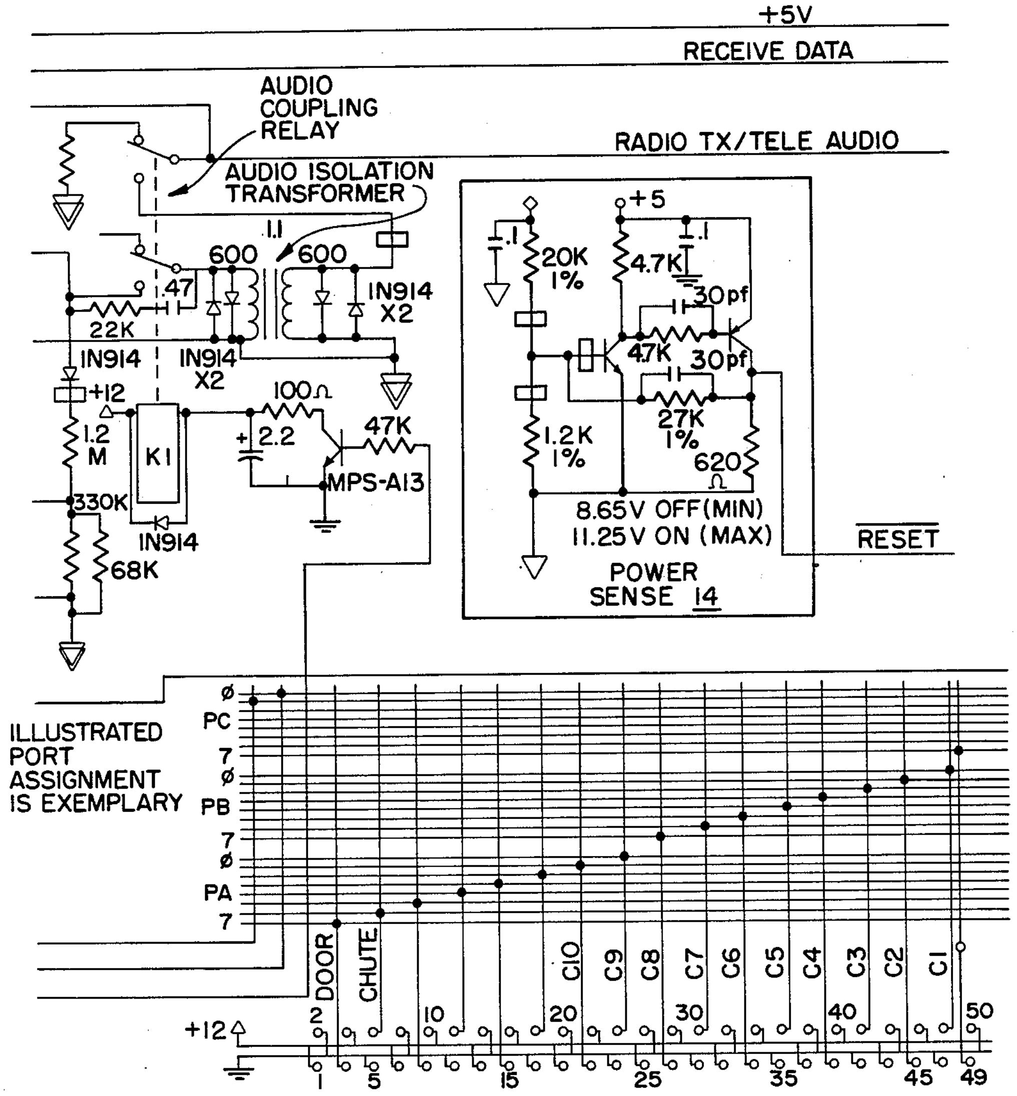
Figure 7:
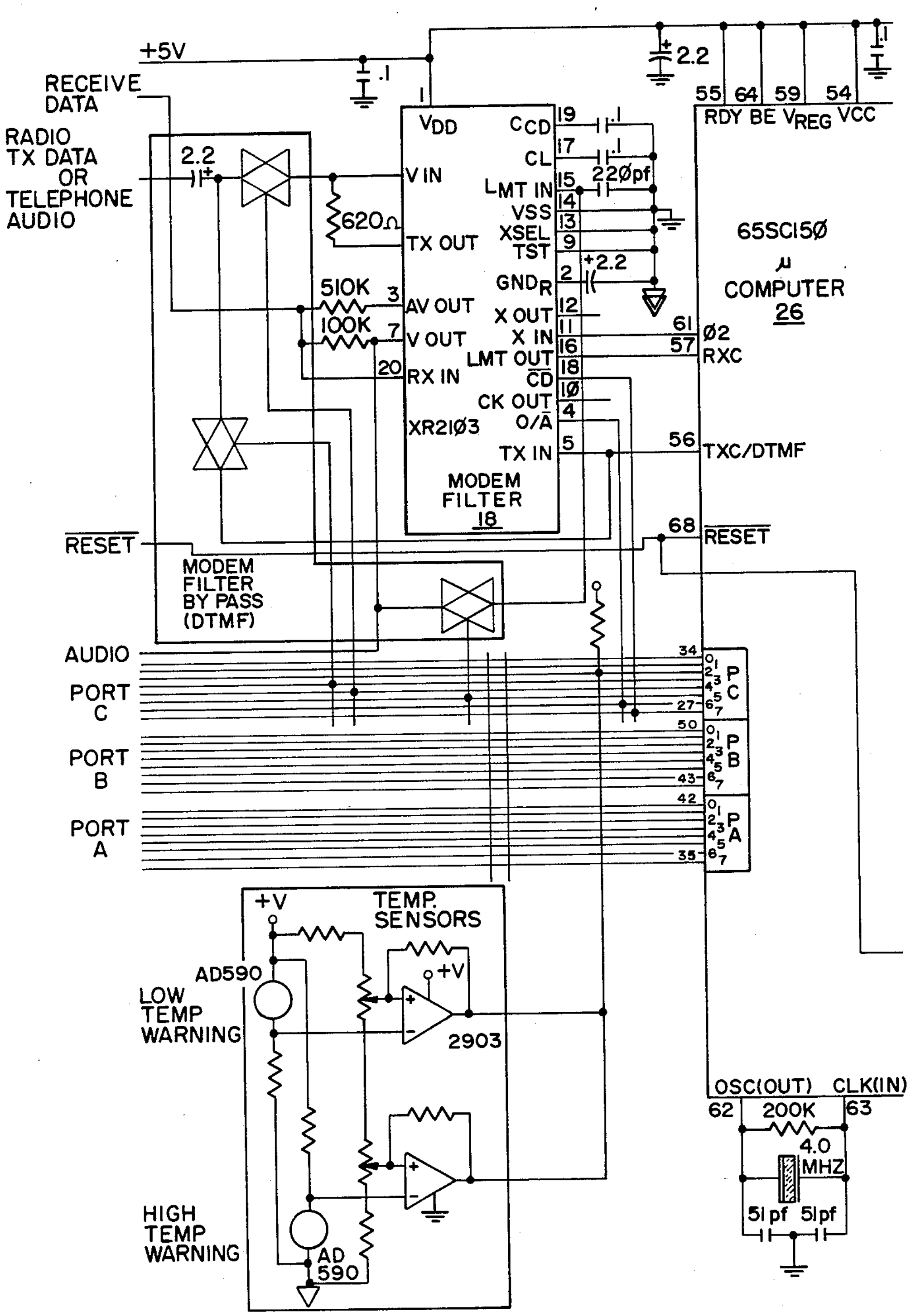
Figure 8:
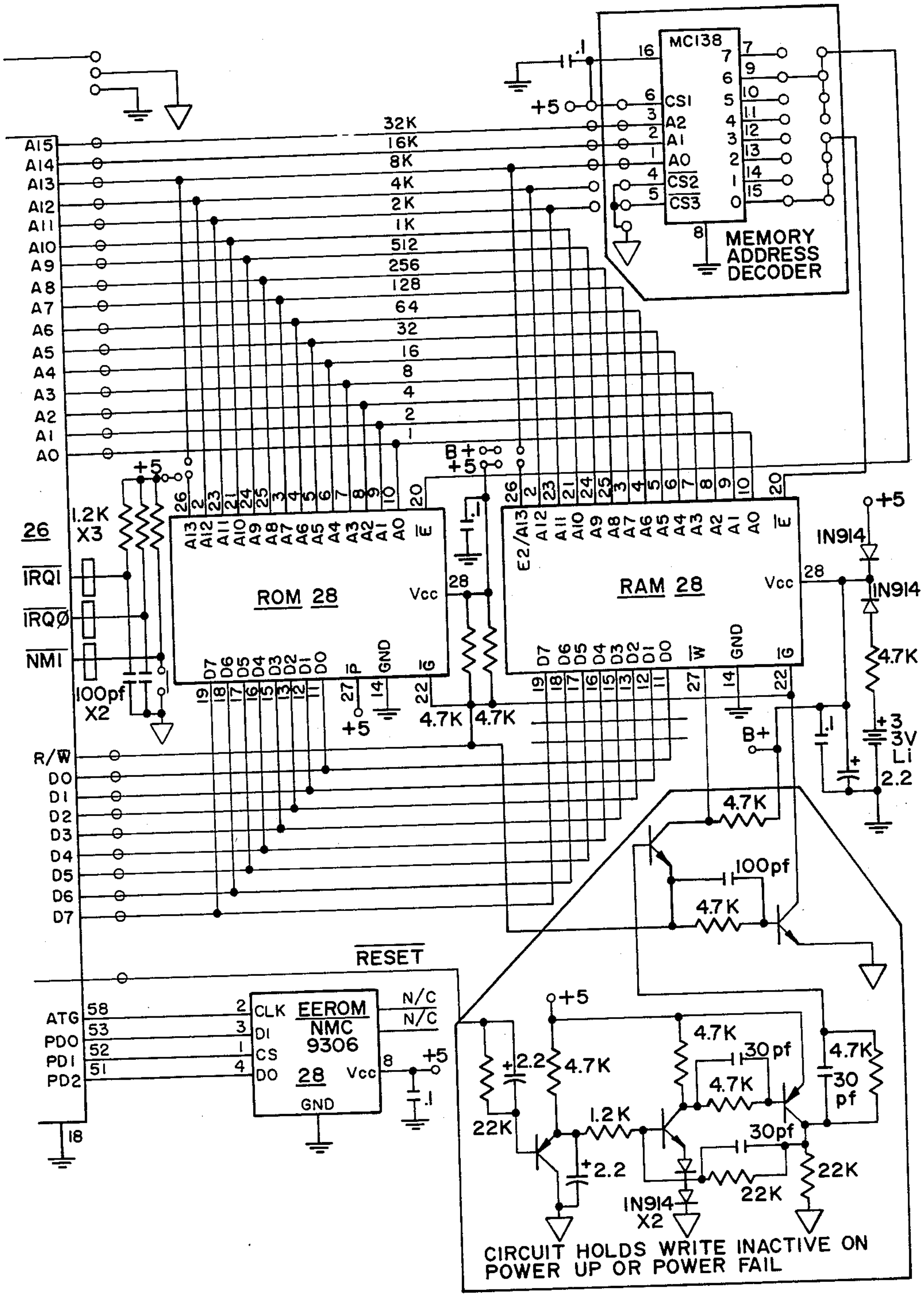

In the power sensor circuit 14, when power is applied, a relatively slow rise in system voltage occurs as the rectified AC input charges the filter capacitors to a nominal DC voltage. During this period of time, if the microcomputer were not held inactive, it could exibit erratic behavior and possibly alter data in RAM memory. To avoid this, the power sensor circuit monitors the input to the +5 volt regulator, and holds the microcomputer in a "reset" state until the input voltage is sufficient to guarantee that the +5 volts power supply is stable. When the voltage reaches a safe operating point, the sensing circuit releases the "reset" line to the microcomputer and allows operation to begin. Operation will continue until the line voltage drops below the minimum allowable and the sensor circuit resets the microcomputer. Hysterisis in the sensor circuit separates the "on" and "off" voltages so that the system does not oscillate. In order to further protect the RAM memories, additional circuitry is provided to render the RAM "write" input inactive for several milliseconds after the microcomputer is started. In alternative embodiments, the power sense circuit 14 of FIG. 6 might be replaced by an integrated circuit designed to perform the same function, as are now available from Motorola.

A low voltage (such as a "brown out" condition) must be detected and appropriate actions taken before the processor or the RAM memory are affected. Unpredicatable operation could result if the microcomputer is not stopped before the power fails completely. Otherwise, data could be lost if the RAM is not dissabled before power fails. Data in an external RAM is retained, when power is off, by a 3 volt lithium backup battery which automatically maintains sufficient voltage to retain data therein for 5–10 years of continuous power outage. If the input voltage to the +5 volt regulator falls below a safe value, the circuit simultaneously resets the microcomputer and dissables the RAM "write" input. Controlling both the microcomputer and the RAM provides an added assurance of data integrity.

The telephone interface 16 consists of the following components or elements. A modular connector is used to easily connect the Telelink system to the telephone line. A hook switch is provided, which is an FCC certified relay that makes and breaks ("off hook" and "on hook" respectively) the connection to the telephone line under microcomputer control. The hook switch may also be used to "pulse dial" in areas not serviced with "Touch Tone" dialing capabilities. A line isolator is also provided, which is an FCC certified 600 ohm audio transformer, the primary purpose of which is to electrically isolate the telelink circuits from the telephone lines as required by FCC regulations, Part 68. A secondary purpose of the line isolator is to provide a DC load necessary to maintain connection with the telephone company central office switching equipment. A line status monitor is also provided, which is a circuit designed to indicate to the microcomputer if the telephone line is in-use. The circuit voltage trip point and hysteresis provide a reliable line status indication which permits the microcomputer to make "call/don't call now" decisions without ever disturbing the telephone line. As a result, telephone users, at the installation site, will never hear the telelink system clicking on and off the line checking for a dial tone. The line status monitor circuit can employ bipolar transistor circuits, or can employ a MOSFET front-end to achieve a high input impedance necessary to satisfy FCC line leakage requirements. This is necessary because the line status monitor, connected on the telephone line side of the hook switch, is always on the telephone line (even when the telelink system is "on-hook"). Transient suppressors are also provided to protect the telelink circuits from damaging voltage transients which are frequently present on telephone lines. Transient suppression is also used across the hook switch contacts to protect the hook switch from arc damage and to prevent interference with the telelink electronic circuitry.

The modem filter 18 is an integrated circuit (XR-2103) which incorporates therein a switched capacitor filter, a modem carrier detector circuit, and other signal conditioning networks necessary for 300 Baud, FSK, Bell 103, telephone data transmission. The filter is divided into transmit and receive filters. The transmit filters condition the outbound signal so that it conforms to Bell 103 specifications. The receive filters condition the inbound signal to improve reception and data recovery. This circuit is also used to condition the signals for radio transmission and reception. DTMF ("Touch Tone") dialing tones, generated by the microcomputer, cannot pass through the modem filter. Therefore, transmission gates, controlled by the microcomputer, are used to route the DTMF signalling around the modem filter when DTMF dialing is desired. The telelink system is programmed to default to DTMF dialing, and if, after several initial attempts to dial with no response, the telelink system is programmed to attempt pulse dialing. If pulse dialing succeeds, the telelink system stores this information in memory, and is programmed to use pulse dialing from then on. DTMF dialing can be restored by command from the central computer.

The vending machine sensors 20 all are chosen to be attachments to the vending machine, and are low voltage, nonelectrical contacting, mechanical attachments. In the installation of the telelink system, no existing vending machine wires are cut, spliced, or in any way modified. This design approach assures that a malfunction or problem with operation of the telelink system does not adversely affect the operation of the vending machine. The vending machine sensors preferably can be Hall-Effect switches, mechanical switches, solid-state temperature sensor(s) (optional), and may include one or more optical sensors. The sensors 20 are used to monitor the following functions in the machine. Hall-Effect switches are used to monitor motor activity by sensing the magnetic field present whenever a motor is running. The signal generated thereby is a logic-level signal that changes state as the motor's alternating magnetic field changes polarity (this generates a 60 Hz rectangular waveform with about a 65% duty cycle). These sensors may be simply clipped to their respective motors without modification to the vending machine. The column "sold-out" sensing is detected mechanically by micro-switch type switches similar to those presently used for sold-out sensing in the vending machines, which present advantages relative to cost and ease of installation. The additional switch is preferably stacked onto the existing sold-out switches by simply removing two securing screws and then reassembling, with the new switch and two new (longer) screws, which are provided as part of an installation package. The sold-out switches provide a logic "low" output when their respective column is sold-out. The motor sensors and sold-out sensors preferably report to the telelink system on one input per column. For example, the output of the column #1 sold-out switch and the column #1 motor sensor would be carried to the telelink unit on a common wire. This is possible because the outputs are normally "off" (in a high impedance state) and their active outputs, one "low" and one alternating "high" and "low", are individually distinguishable. A sold-out indication, being an active logic "low", would overide its respective motor sensor output, which is acceptable because the vending machine will not authorize a vend in a sold-out column. Hall-Effect switches, mechanical switches, or optical sensors can be used for can-in-chute detection in a variety of techniques, all of which may be accomplished without modification to the vending machine. Front door openings are preferably detected by a mechanical switch, and a delay period, on open and close, ensures that jiggling does not cause multiple door counts. The temperature (high and/or low) is preferably monitored by sold-state sensors installed on the circuit board. Because of the relatively high cost of the sensors, the temperature is preferably monitored as an added option. Accuracy of commercially available temperature sensors is better than +/−2 degrees F.

The coin changer interface 22 is preferably a serial, two wire, (signal and return) interface, and can comprise an optical coupler to provide isolation between the coin changer electronics/electrical system and the telelink system. Connection to the existing coin changer in the vending machine is preferably provided by a small plastic connector, half supplied as part of the telelink system and the other half as part of the coin changer. Since existing commercially available coin changers can be equipped to interface with the telelink system, no vending machine modification is necessary in order to monitor the coin changer.

The radio interface 24 is preferably a compatible and universal electronics design, which can be provided by an advantageous inferface of hardware and software to provide a universal design.

The microcomputer 26 is preferably a GTE 65SC150 Communications Terminal Unit, incorporating a modem 27 therein and being capable of generating Touch Tone signalling tones, encoding and decoding 300 Baud, FSK, modem signals, and is a stand-alone microcomputer as well. This microcomputer has 2048 bytes of mask programmable ROM, 64 bytes of RAM, a timer/counter, and 27 I/0 ports. The microcomputer controls all of the telelink logical and signalling functions through the sequential execution of instructions stored both in its internal ROM and RAM and in external ROM and RAM.

Five classifications of memory 28 are preferably provided in the telelink system. An internal masked ROM provides 2048 bytes of non-alterable memory that is preferably programmed at the factory at the time the 65SC150 is fabricated. An internal RAM provides 64 bytes of read/write memory that the microcomputer uses to store temporary data such as results of tests, computations, and elapsed time, and is basically used as a scratch pad. The RAM is volatile and will not store data if power is removed. An external masked ROM is provided, which except for size, is exactly the same as the internal ROM, but resides in its own package on the circuit board. An external RAM is also provided, which except for size, is exactly the same as the internal RAM, but resides in its own package on the circuit board. An external EEPROM also provides a 256 bit serially addressed non-volatile memory. It is different because it may be erased and written to by the microcomputer, in circuit, but will store the data indefinitely without power. The EEPROM has a limited number of erase/write cycles, and is generally too costly to use for large storage applications. Therefore, the EEPROM is used to store critical, rather permanent, data that is downloaded to the telelink system from the central computer, either during initial set-up or while in the vending machine. EEPROM data is only updated if the new data is different from the data in the EEPROM. This prolongs the service life of the EEPROM and, since erasing and writing is slow in this type of memory, it does not distract the microcomputer from its normal machine monitoring tasks unless absolutely necessary. This type of data includes parameters such as: call time, serial number, telephone number, and machine personality data, as normally this type of data will never change once the unit is in operation.

In general operation, when power is first applied, the microcomputer and RAM are dissabled until the output of the power supply has stabilized. The power sensor circuit 14 then releases the "reset", allowing the microcomputer 26 to start. Several thousandths of a second later, the RAM "write" line is enabled to allow it to operate. This start-up sequence prevents the microcomputer from writing erroneous date into the RAM memories during the start-up period. When the "reset" is released, the microcomputer fetches the first instruction from the internal ROM and executes it, and subsequent instructions, according to the sequence prescribed by the instructions. External events can modify the normal sequence of program execution with predetermined responses, as per the programming instructions. Normal program execution causes the microcomputer to continuously input data from several sources such as ports, timers, registers, and memory. Data input during this "polling" is subjected to tests, and if the test results are negative, normal processing continues, and if positive, exception processing begins. When a motor runs, the microcomputer checks the motor run time to determine if it ran long enough, too long, did a can pass through the chute?, etc. The microcomputer 26 is also constantly checking a time counter to see if it is time to call home. If, during one polling loop, the timer value compares with the stored value received from the central computer, the microcomputer initiates a call home. Normal machine operating data is accumulated in RAM locations. Although clearing or presetting of these registers is possible, normally they are allowed to "roll over" and the "roll over" computation is handled by the central computer.

A telephone call can be initiated for many reasons, some optional. If a call is to be made, the microcomputer checks the line to see if it is in-use. If not, it closes the hook switch relay (goes "off-hook") and dials with DTMF tones. When the central computer modem answers, the telelink system transmits its data and waits for data from the central computer. When the central computer is done, both units hang up.

Radio transmission occurs periodically, preferably about once an hour and is only in the outbound direction (simplex) from the machine. A receiving telelink is positioned up to 100 feet away and is connected to the telephone line. The receiving telelink system only receives inbound (simplex) data. Radio transmission is given the lowest priority because it may occur so frequently that data missed may be obtained again later without penalty. To transform a telelink unit into a hardwired "transmit", or "receive" unit, all that is required is the attachment of the proper hardware (transmitter, receiver, and/or telephone wire, and/or machine harness) and the proper data loaded from the central computer.

A typical vend scenario is as follows. Assume that three quarters are inserted into the coin slot for a 60 cent vended product. The coin changer counts the coins until the credit amount is reached. It then dispenses three nickels in change. The instant the last coin is returned in change, the coin changer sends a serial message to the telelink system containing all the data regarding the money in, money out, coins in tubes (if available on changer), vend price, etc. After the data is transferred to the telelink unit, the coin changer energizes the credit relay in the vending machine. With the credit relay energized, a product can be vended any time a select button is pressed for a column that is not sold out. Pressing of a select button could cause several sequences to occur.

If the select button is pressed and released quickly, the motor may run for just a fraction of a second. Unless the motor runs long enough to cause the cam to engage the "continue" switch, the motor will stop, credit will still be valid, and any selection may still be made as if no selection had been attempted. The telelink system does not log the motor activity as a vend attempt. In a normal vending sequence, the select button is pressed long enough to cause a valid vend cycle to engage. If a can jams in the mechanism, thereby not allowing the cam to complete its cycle, the motor will run continuously. Some motors have thermal protection and will cycle on and off until the jam is fixed and the switch is permitted to turn off. The telelink system is programmed to recognize this as a jam, and calls the central computer if that option is selected on the unit. The telelink system does not call again if a motor shuts down due to the thermal protector and then restarts. If a motor completes its vend cycle, but no product exits through the product dispensing chute, this sequence could be caused by the failure of a sold-out switch to activate when the column was empty. Alternatively, a can could have become stuck elsewhere, perhaps higher in the column or in the chute. The telelink system recognizes this as a jam because a vend motor ran long enough but nothing passed through the chute, and calls the central computer (if this option is selected). When a motor completes its vend cycle and product passes through the chute, a normal vend is logged by the telelink system. The system is also programmed to cause jams to set flags and cause one call to the central computer. The jam flags are cleared when the door is opened and then closed once.

In normal operation, the telelink system continues to log data until the elapsed time counter matches the "call on time" register value. At this time, if the phone line is not in-use, the telelink system calls and transfers the data to the central computer. If the phone line is in-use, or the call does not result in a complete transaction, the telelink system tries again as instructed by "Re-call" register values. A successful call (and data transfer) results in the telelink system receiving all of the data listed below in the initialization parameters. However, the telelink unit only acts on the data if it is different from the data it already has in memory. This permits control of the telelink unit from the central computer.

During the factory set-up procedure, the parameters needed to customize the telelink system for the type of vending machine it will monitor, and other initialization data, are programmed into the telelink system memory. This is preferably accomplished by a simulated telephone call. The telelink system is placed in an initialization mode and makes a simulated phone call to a special test fixture. The test fixture answers the telelink unit and responds with parameters previously entered via it's own keyboard. The test fixture is very much like a typical central computer with the addition of a central office simulator, thus permitting tests to be run as if the telelink unit were calling on a normal telephone line. The initialization parameters include:

| | |
|---|---|
| 1. Unit serial number | 4 digits |
| 2. Central telephone number | up to 20 characters including pauses |
| 3. Machine profile | 1 of 16 models |
| 4. Call on power-up | yes/no |
| 5. Call on door open | yes/no |
| 6. Call on door close | yes/no |
| 7. Call on jam | yes/no |
| 8. Call on sold-out | yes/no |
| 9. Call on time | yes/no |
| 10. Call hour | specify the hour to call |
| 11. Call on temperature | yes/no |
| 12. Re-call interval (minutes) | specify |
| 13. Re-call attempts (1-16) | specify |
| 14. Set registers | yes/no |
| 15. Clear flags | yes/no |
| 16. Spare | specify |

These parameters 1-11 are stored in the EEPROM memory.

The profile includes minimum valid motor run time, maximum cycle time, door open delay time, and door closed delay time. "Set registers" cause the telelink unit to accept new register values. Initially, these register values are set to zero, but any register values will work at start-up. If the telelink unit calls with unreasonable values or a bad check-sum, the central computer tests the "set registers" flag in EEPROM, to determine if the last known valid data values should be transferred back into RAM memory.

During normal operation of the microcomputer, as soon as the "reset" is removed, the microcomputer performs selected system checks and initializes the ports. It then checks the status flags, determines that a power-on reset has occured, and calls the central computer, normally located at a servicing bottling plant. The microcomputer is programmed to initiate phone calls, which can be initiated for any of the following reasons:

1. Machine jams
2. Columns sold-out
3. Refrigerator temperature
4. Opening front door
5. Daily report
6. Coin changer FIGS. 2, 3 and 4 together represent a simplified logic flow diagram for the programming of the microcomputer, with FIG. 2 placed on top of FIG. 3, which is placed on top of FIG. 4.

Figure 2:
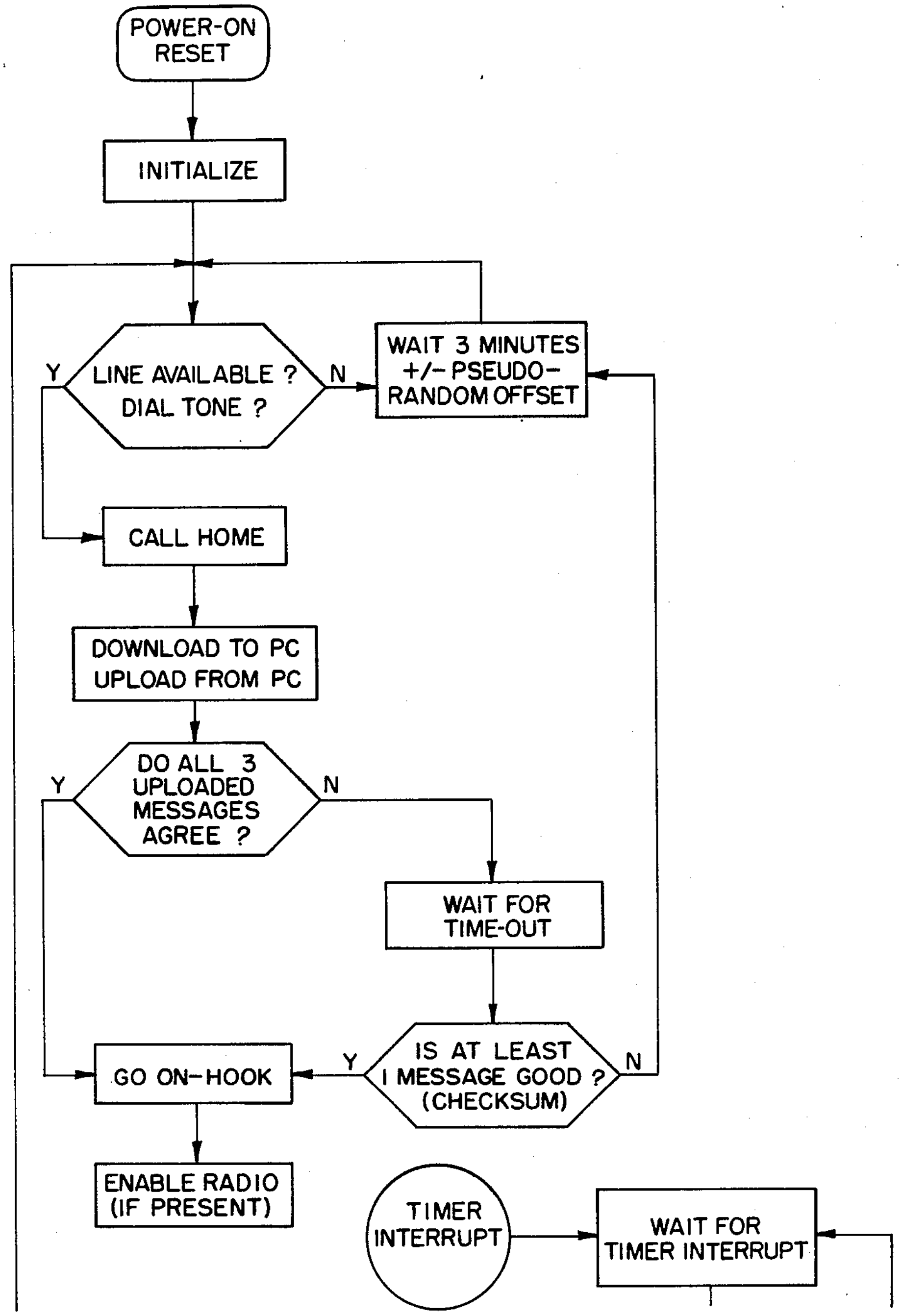
FIGS. 2, 3 and 4 are one simplified logic flow diagram, which should be assembled with FIG. 2 on top, FIG. 3 in the middle, and FIG. 4 on the bottom, and illustrate the logic flow of the main operational computer program for the microprocessor of the telelink system.

Referring specifically to FIG. 2 and the logic flow illustrated therein,

All phone calls "home" subscribe to the following format:

1. Examine the phone line status. (Is it in use or not?)
   a. If in use, try again later.
   b. If not in use, close hook-switch.
2. Listen for dial-tone.
   a. If no dial-tone, hang-up, try again later.
   b. If dial-tone, dial number.
3. Listen for the "home" modem carrier.
   a. If a no carrier is detected, hang-up and try again later.
   b. If a carrier is detected, transmit (outbound) message three times.
   c. If the carrier stops, hang-up and try again later.
4. Receive (inbound) three messages from "home".
   a. If all three messages agree, hang-up.
   b. If all three messages do not agree, wait for time out and;
      1. If at least one message is valid, store data, conclude activity.
      2. If no message is valid, try again later.

Figure 3:
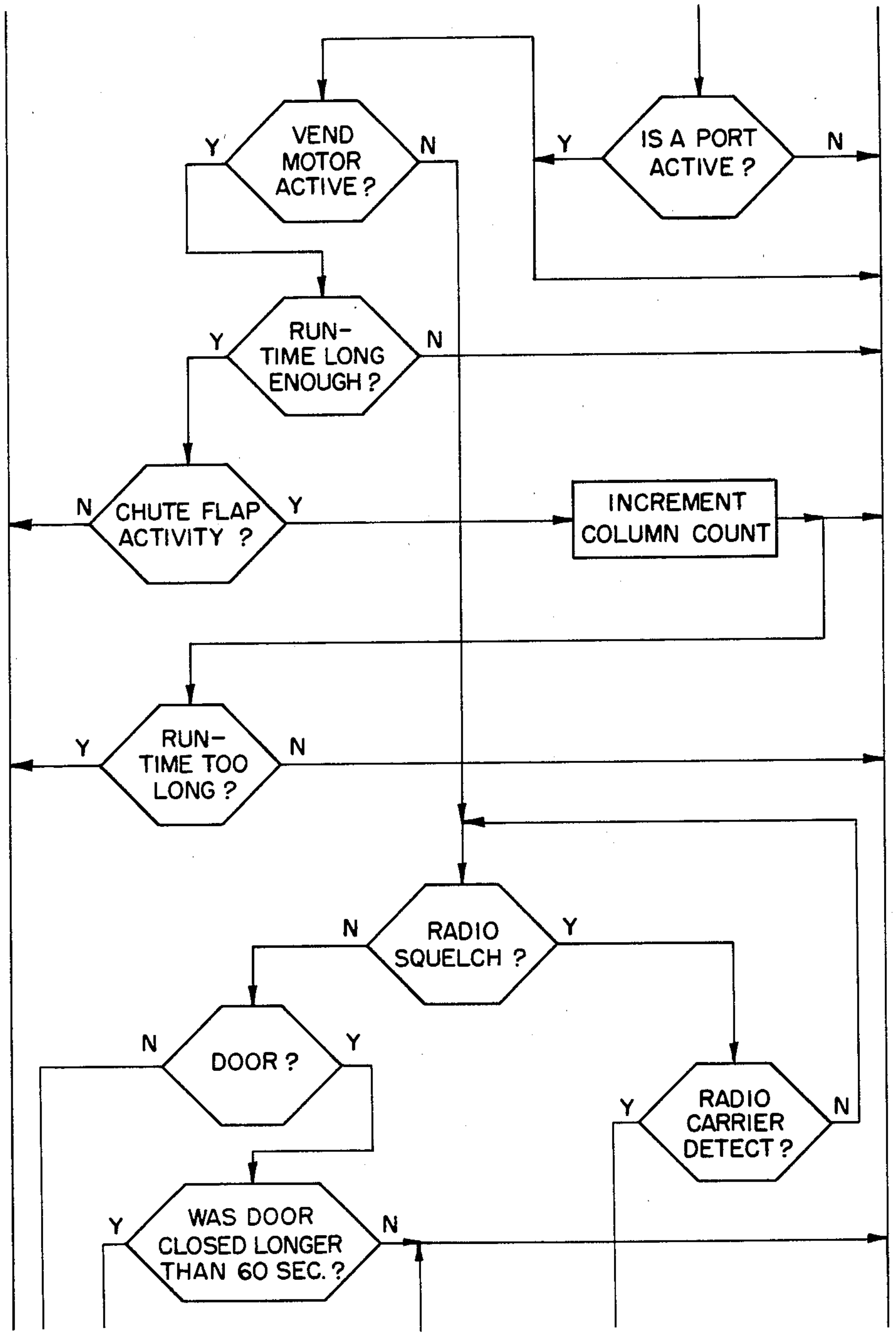

Referring specifically to the bottom of FIG. 2 in the logic flow diagram starting at "timer interrupt", and continuing on in the logic flow of FIG. 3, at short (millisecond) periodic intervals, the microcomputer constantly monitors the machine sensors for activity. Should machine activity occur while the telephone is off-hook, the telephone activity is suspended until the machine activity ceases. In the designed embodiment illustrated by the logic flow diagrams of FIGS. 2 and 3, the software was programmed to use a 5 ms timer interrupt interval in a noncommunication mode. However, when the telelink system reports over a telephone link in a communication mode, the timer interrupt interval is charged to 3.3 ms to permit data transfer at a 300 baud rate. Accordingly, if vend machine activity occurs during the communication mode, the telelink system suspends the communications mode and reverts back to a 5 ms timer interrupt interval to allow monitoring of the vend machine activities. However, in an alternative and preferred embodiment, the telelink system is preferably designed to both monitor vend machine activities and communicate without suspending the other mode of activiy. One approach to accommodate this design goal is to reprogram the monitoring of the vend machine activity to be 3.3 ms or less, to allow both functions to be performed within a 3.3 m sec timer interrupt interval.

Figure 4:
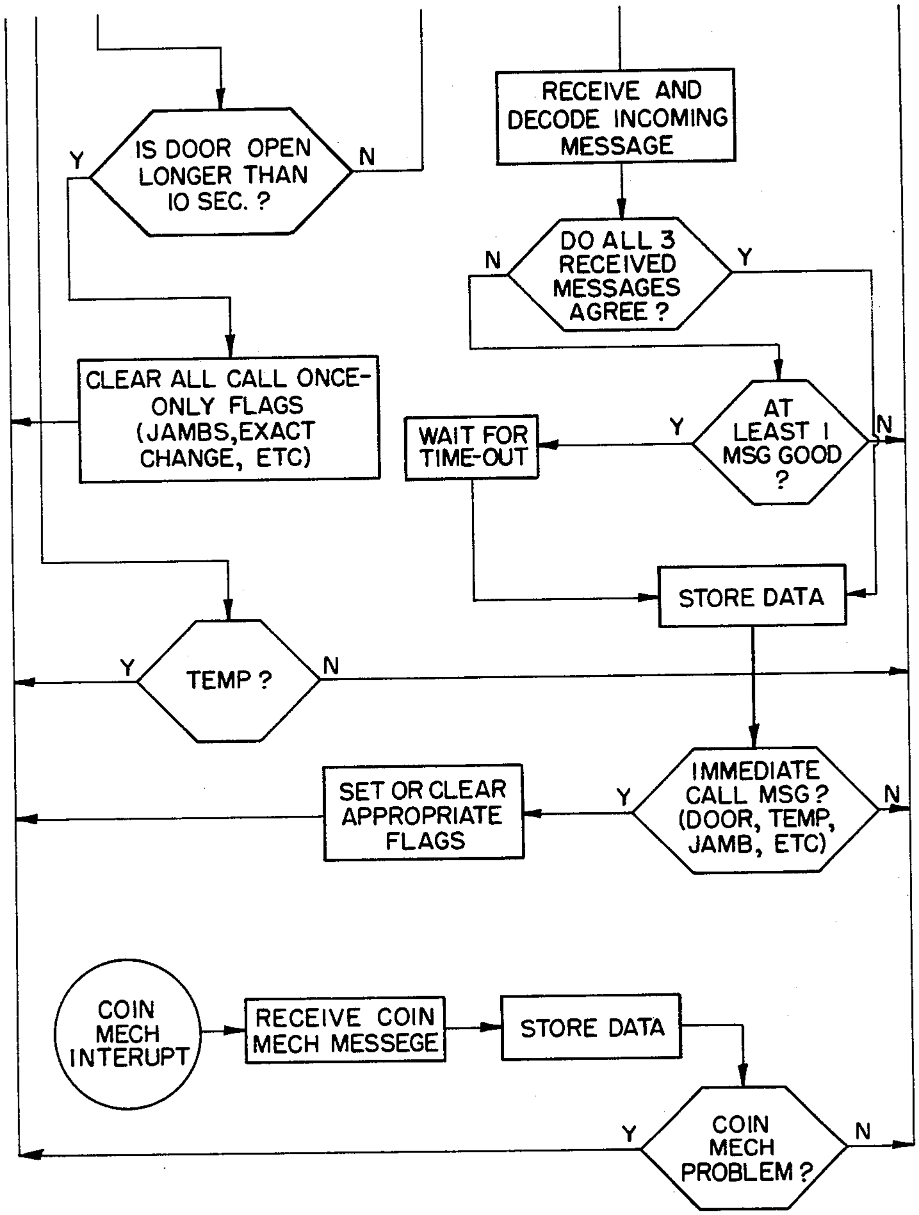
Figure 5:
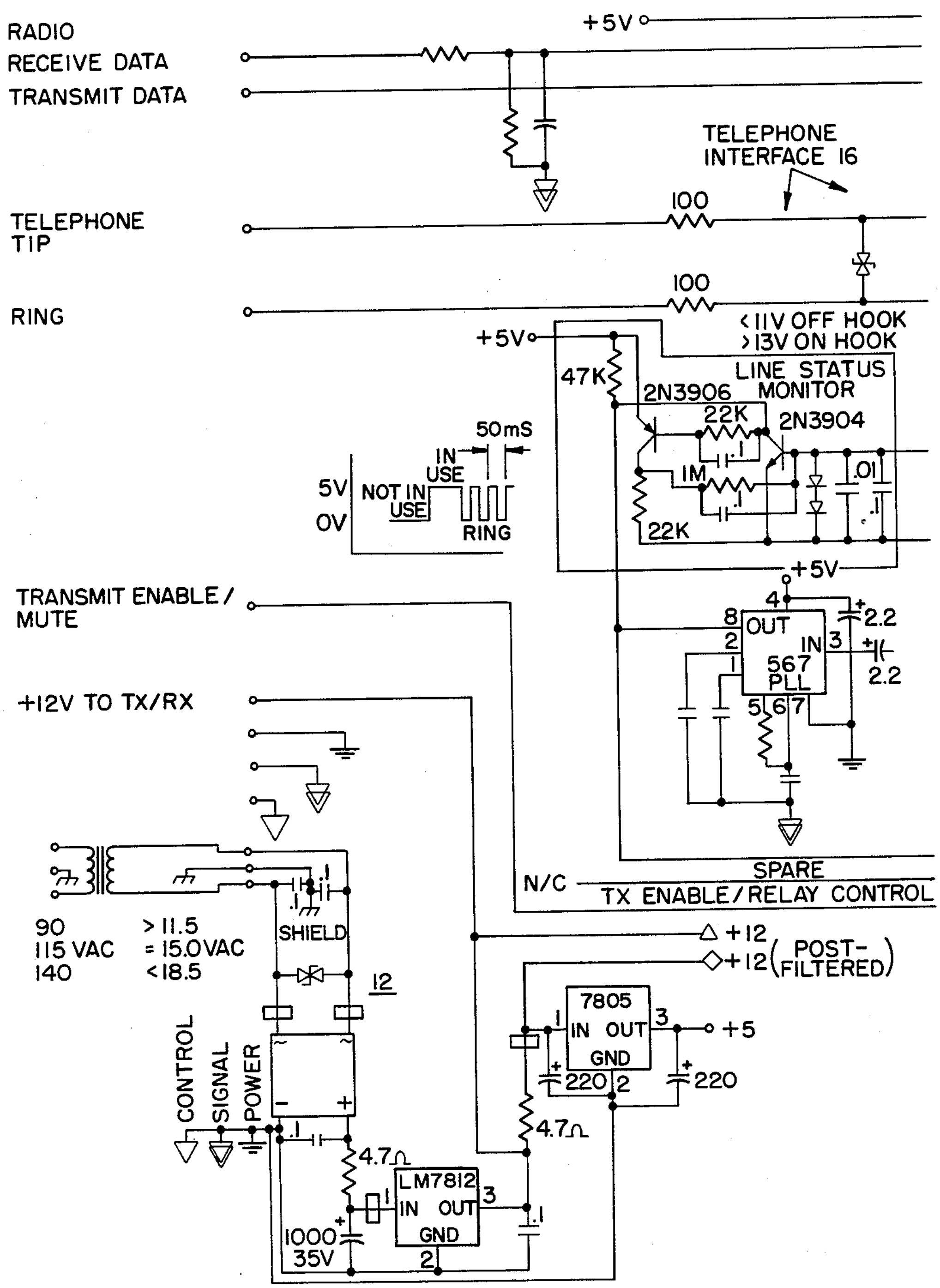
FIGS. 5, 6, 7 and 8 are one schematic circuit, assembled with FIG. 5 on the left, FIG. 6 next on the right, FIG. 7 next on the right, and FIG. 8 being on the extreme right, and illustrate an electrical schematic of one designed embodiment of the telelink system.

The various machine sensors, attached to the vend motors, sold-out switches, chute flap, and front door, sense the activity of their respective actuators. The microcomputer monitors the sensor activity and makes decisions, as shown in FIGS. 3 and 4 according to the following criterion:

a. Vend motor
   1. Function—column vend count, jam detection.
   2. Output—The sensor output is normally a (passive) logic "high" with no motor activity. When the motor is energized, the sensor output alternates between a logic "high" and a logic "low" with each full cycle of the AC current which is powering the motor.
   3. Timing—The motor must operate for a minimum period of time (the time varies depending on the make and model of the machine and may be altered by the "home" computer), after which the vend count is incremented. In the event the motor does not shut off, the continuous sensor activity, for more than 10 seconds, initiates a jam response and the system calls the central computer.
   4. Response—Totalize, place call if motor runs-on.

b. Sold-out switches
   1. Function—empty column detection.
   2. Output—The sensor output is a (passive) logic "high" when the column is not sold-out. It is logically "wire OR'ed" with the vend motor sensors.
   3. Timing—Sensor status is captured at the time a call to the central computer is initiated.
   4. Response—Place call (option programmable from the central computer).

c. Chute flap
   1. Function—jam detection.
   2. Output—The sensor is normally a logic "low" when the flap is closed. When the flap is opened, the output reverts to a (passive) logic "high".
   3. Timing—This sensor is only monitored during a specific time window following the activity of a vend motor. If the flap is stuck open, vends will still be counted, but jams (other than continuous motor run) are not detected.
   4. Response—Call central computer if jam detected (in conjunction with vend motor activity), totalize.

d. Front door
   1. Function—Report period, unauthorized entry alert.
   2. Output—The sensor output is a logic "low" when the door is closed. When the door is opened, the output reverts to a (passive) logic "high".
   3. Timing—The door must be opened for more than 10 seconds, and then closed for more than 60 seconds, to be counted.
   4. Response—Call the central computer (option programmable from the central computer); totalize.

e. Optional Temperature Sensing
   1. Function—high temperature detection.
   2. Output—The sensor output is a logic low when the temperature is in normal permissive range. When the temperature varies above the permissive range, the output reverts to a (passive) logic "high".
   3. Timing—The sensor is constantly monitored.
   4. Response—Call the central computer if an abnormal temperature is sensed.

The telelink system can be optionally installed with a radio transmitter and a radio receiver. When an optional radio transmitter is installed, it will transmit everything that would normally have been sent via the telephone, to a radio receiver located not more than 100 feet away which, in turn, connects to the phone line. Operation and message formats for the radio transmitter-equipped units are identical to that of the non-radio units with the exception of the frequency-of-transmission of the system status. Instead of a once-per-day report, the transmitter-equipped unit transmits its status as often as once every 10 minutes. It also immediately transmits in the event of jams, door openings, sold-outs, temperature problems, etc.

When a radio receiver-equipped unit is not busy with vends, phone messages, or coin changer activities, it can receive transmissions from any nearby transmitter. It will only respond to transmitters whose serial numbers match those programmed into the memory of the receiver unit. The receiver unit continuously updates it's memory to reflect the status of the respective transmitters reporting to it. Should the receiver unit receive an emergency message, it responds with an immediate call to the central computer (providing that option has been selected). Otherwise, it only reports to the central computer once a day at a selected time, which can be scheduled at night to minimize the possibility of the telephone line being busy.

The telelink system of the present invention has been described in detail hereinabove with respect to the function of monitoring the activities of a vending machine. However, the telelink system has direct application to several different types of commerical reporting systems. For instance, the reporting system might comprise a commercial drink dispensing system which includes a digital control system, preferably microprocessor controlled, which monitors the overall operation of the drink dispensing system and stores in memory information pertinent to the operation thereof. The monitored information could include temperature, such as the temperature of a syrup or the temperature of a dispensed product, run or on times, such as the run time of a carbonator or the on time of a dispensing valve, and dispensing information, such as the type and quantity of product dispensed. The monitored information could be periodically reported to one or several different facilites, such as the customer account, a bottler servicing the account, a regional office, or a parent company.

The telelink system of the present invention could also be utilized in association with a bulk syrup delivery system of the type disclosed generally in U.S. Pat. No. 4,553,513 for a Bulk Syrup Delivery System. In this type of system, the bulk delivery of several different types of syrup can be metered by a computer system, and a delivery ticket printed after delivery showing the quantity delivered of each flavor syrup. The amount of syrup in a tank can be monitored by a fiber optic probe unit with multiple fiber optic probes at multiple sensing levels in the tank such that observation of the probe unit provides a ready indication of the syrup level in the tank. One fiber optic probe unit can be provided for each different flavor syrup. A light sensing electronic circuit is coupled to the fiber optic probe head, such that the level of syrup remaining for each flavor can be read and transmitted, over wire or fiber optic lines, to a remote sensor or monitor. The monitor can register the syrup level, by flavor, and display the information in any location at an account. This enables an instant reading of tanks in a basement, back room, or other remote, inaccessible location. The telelink system can monitor and transfer this information by telephone line to a central computer. The inventory information can be matched against historical usage, known tank capacity, and other data to determine the delivery schedule needed to assure fresh product and on-time delivery. The infomation could also be transmitted to a headquarters operation for inventory and daily sales analysis. Additionally, a manual override switch, connected to a keyboard at the telelink installation can be provided a allow an account operator to electronically input a service/repair call by activating the override switch and keying in a repair code. A listing of many different repair or service codes could be utilized with the system. A repair or service request could be displayed at a central location, such as a display on the bottlers screen, with the time, account information, and nature of the request or problem. This would eliminate the need to call for service, and would minimize delays in dispatching a serviceman. Additionally, the response time could also be automatically determined if the mechanic/serviceman were instructed to signal the system upon arrival at the account.

While a preferred embodiment and several variations of the present invention for a telelink monitoring and reporting system are described in detail herein, it should be apparent that the disclosure and teachings of the present invention will suggest many alternative designs to those skilled in the art.

What is claimed is:

1. A telelink system particularly designed for interface with a vending machine, without interrupting or disturbing the existing vending machine electrical circuits or affecting the normal operation of the vending machine, comprising:

a. a microprocessor, having a memory associated therewith, for controlling operation of the telelink system, and also for storing in said memory data related to the overall status of the vending machine, including total vends of each of several vended products, inventory of each of several vended products, cash taken in by the machine, and data related to the status of the vending machine;

b. a plurality of machine status sensors, for reporting on the vending machine status without interrupting normal vending machine functions, said vending machine status sensors comprising sensors which are installed as add-on attachments to the vending machine without interrupting the existing vending machine electrical circuits or affecting the normal operation of the vending machine, such that operation or a malfunction of the telelink system does no adversely affect operation of the vending machine;

c. a telephone interface circuit connecting the telelink system to a telephone line to enable the microprocessor to periodically and on a nondedicated basis establish a connection to and use the telephone line, to establish a telephone connection to enable the microprocessor to call a central computer; and d. a modem for enabling data messages to be transferred through said telephone interface circuit to the central computer.

2. A telelink system as specified in claim 1, including a power supply circuit for the telelink system, wherein said power supply circuit has a low voltage input, such that the telelink power supply need not be UL approved.

3. A telelink system as specified in claim 2, including a power sensor circuit coupled to said power supply circuit for sensing when the power supplied by said power supply circuit is stable, said power sensor circuit providing an output signal to a reset input of said microprocessor to hold the microprocessor in a "reset" state until the power supplied by said power supply is stable, said microprocessor also storing data in RAM memory, and said power sensor circuit providing an output signal to said RAM memory to hold the RAM "write" input inactive until a given time delay after the microprocessor is released from the "reset" state.

4. A telelink system as specified in claim 3, including an external RAM memory having a backup battery power supply to store data therein in the event of a power failure by said power supply.

5. A telelink system as specified in claim 1, said telephone interface circuit including an FCC certified relay hook switch to make telephone connections, means, controlled by said microprocessor, for generating touch tone dialing signals, and said microprocessor also controlling operation of said hook switch to produce pulse dialing signals in telephone areas not serviced by touch tone dialing.

6. A telelink system as specified in claim 5, said telephone interface circuit further including a telephone line status monitor circuit for indicating to the microprocessor whether or not the telephone line is in-use, such that the microprocessor does not disturb the telephone line during normal usage thereof.

7. A telelink system as specified in claim 1, further including a modem filter circuit, including a modem filter circuit coupled to said modem and said microprocessor, including transmit filters for conditioning outbound signals to said telelphone interface circuit to telephone system specifications, and receive filters for conditioning inbound signals from said telephone interface circuit to improve reception and data recovery therefrom, and transmission gates, controlled by the microprocessor, in parallel with said modem filter circuit to bypass the modem filter circuit during touch tone dialing.

8. A telelink system as specified in claim 1, wherein the vending machine includes a coin changer, said telelink system further including a coin changer interface circuit, coupled to the coin changer and also to said microprocessor, said coin changer interface circuit incorporating therein optical coupling means to provide the telelink system with electrical isolation from the coin changer electrical system.

9. A telelink system as specified in claim 1, including a local radio receiver coupled to the telephone line servicing the telelink system, and a radio interface circuit for providing a simplex radio link in an outbound direction only to said local radio receiver coupled to the telephone line servicing the telelink system.

10. A telelink system as specified in claim 1, said microprocessor comprising a commercially available microcomputer which incorporates therein said modem, is capable of generating touch tone signals, and encoding and decoding frequency-shift-key modulation signals.

11. A telelink system as specified in claim 10, said microcomputer having internal RAM and ROM memories, and the telelink system additionally including external RAM and ROM memories, and an external EEPROM memory which stores data without power and which is used to store relatively permanent data, including the vending machine identification number, the telephone number to be called to reach the central computer, and data on the parameters of the particular vending machine to which the telelink system is coupled.

12. A telelink system as specified in claim 1, said microprocessor being programmed to periodically, at regular intervals, attempt to place a telephone call to said central computer to download data from the telelink system to said central computer, and for receiving data from said central computer.

13. A telelink system as specified in claim 1, said microprocessor being programmed to give data collection by said plurality of machine sensors a higher prority over other tasks performed by the microprocessor.

14. A telelink system designed to report data pertinent to the commercial operation of a reporting system to a data collection processor system without interrupting or disturbing the existing reporting system electrical circuits or affecting the normal operation of the reporting system, comprising:

a. a microprocessor, having a memory associated therewith, for controlling operation of the telelink system, and for storing in said memory data related to the overall status of the commercial operation of the reporting system including totals, inventory, and data relating to the status of the reporting system;

b. a plurality of reporting system status sensors, for reporting on the reporting system status without interrupting normal operation thereof, said status sensors comprising sensors which are installed as add-on attachments to the reporting system without interrupting the existing reporting system electrical circuits or affecting the normal operation of the reporting system, such that operation or a malfunction of the telelink system does not adversely affect operation of the reporting system.

c. a telephone interface circuit connecting the telelink system to a telephone line to enable the microprocessor to periodically and on a nondedicated basis establish a connection to and use the telephone link, to establish a telephone connection to enable the microprocessor to call the data collection processor system; and d. a modem for enabling data messages to be transferred through said telephone interface circuit and the telephone line to the data collection processor system.

15. A telelink system as specified in claim 14, including a power supply circuit for the telelink system, wherein said power supply circuit has a low voltage input, such that the telelink power supply need not be UL approved.

16. A telelink system as specified in claim 15, including a power sensor circuit coupled to said power supply circuit for sensing when the power supplied by said power supply circuit is stable, said power sensor circuit providing an output signal to a reset input of said microprocessor to hold the microprocessor in a "reset" state until the power supplied by said power supply is stable, said microprocessor also storing data in RAM memory, and said power sensor circuit providing an output signal to said RAM memory to hold the RAM "write" input inactive until a time delay after the microprocessor is released from the "reset" state.

17. A telelink system as specified in claim 16, including an external RAM memory having a backup battery power supply to store data therein in the event of a power failure by said power supply.

18. A telelink system as specified in claim 14, said telephone interface circuit including an FCC certified relay hook switch to make telephone connections, and means, controlled by said microprocessor, for generating touch tone dialing signals, and said microprocessor also controlling operation of said hook switch to produce pulse dialing signals in telephone areas not serviced by touch tone dialing.

19. A telelink system as specified in claim 18, said telephone interface circuit telephone further including a telephone line status monitor circuit for indicating to the microprocessor whether or not the telephone line is in-use, such that the microprocessor does not disturb the telephone line during normal usage thereof.

20. A telelink system as specified in claim 14, further including a modem filter circuit, coupled to said modem and said microprocessor, including transmit filters for conditioning outbound signals to said telephone interface circuit to telephone system specifications and receive filters for conditioning inbound signals from said telephone interface circuit to improve reception and data recovery therefrom, and transmission gates, controlled by the microprocessor, in parallel with said modem filter circuit to bypass the modem filter circuit during touch tone dialing.

21. A telelink system as specified in claim 14, including a local radio receiver coupled to the telephone line servicing the telelink system, and a radio interface circuit for providing a simplex radio link in an outbound direction only to said local radio receiver coupled to the telephone line servicing the telelink system.

22. A telelink system as specified in claim 14, said microprocessor being embodied in a commercially available microcomputer which incorporates therein said modem, is capable of generating touch tone signals, and encoding and decoding frequency-shift-key modulation signals.

23. A telelink system as specified in claim 22, said microcomputer having internal RAM and ROM memories, and the telelink system additionally including external RAM and ROM memories, and an external EEPROM memory which stores data without power and which is used to store relatively permanent data, including the reporting system identification number, the telephone number to be called to reach the data collection processor system, and data on the parameters of the particular reporting system to which the telelink system is coupled.

24. A telelink system as specified in claim 14, said microprocessor being programmed to periodically, at regular intervals, attempt to place a telephone call to said data collection process system to download data from the telelink system to said data collection processor system, and for receiving data from said data collection processor system.

25. A telelink system as specified in claim 14, said microprocessor being programmed to give data collection by said plurality of status sensors a higher priority over other tasks performed by the microprocessor.

26. A telelink system as specified in claim 14, in combination with a commercial drink dispensing system.

27. A telelink system as specified in claim 14, in combination with a bulk syrup delivery system for monitoring and transmitting information on the levels in different tanks of different flavor syrups.

* * * * *